(12) United States Patent
Bourne et al.

(10) Patent No.: US 7,322,205 B2
(45) Date of Patent: Jan. 29, 2008

(54) HYDRONIC ROOFTOP COOLING SYSTEMS

(75) Inventors: Richard C. Bourne, Davis, CA (US);
Brian Eric Lee, Monterey, CA (US);
Mark J. Berman, Davis, CA (US)

(73) Assignee: Davis Energy Group, Inc., Davis, CA (US)

( * ) Notice: Subject to any disclaimer, the term of this patent is extended or adjusted under 35 U.S.C. 154(b) by 461 days.

(21) Appl. No.: 10/885,001

(22) Filed: Jul. 7, 2004

(65) Prior Publication Data
US 2005/0056042 A1 Mar. 17, 2005

Related U.S. Application Data

(60) Provisional application No. 60/502,251, filed on Sep. 12, 2003.

(51) Int. Cl.
*F28D 5/00* (2006.01)
(52) U.S. Cl. .............. 62/305; 62/314; 62/332; 62/DIG. 16
(58) Field of Classification Search ............. 62/33, 62/321, 304–316, 332, DIG. 16
See application file for complete search history.

(56) References Cited

U.S. PATENT DOCUMENTS

| | | | | |
|---|---|---|---|---|
| 4,505,327 A | * | 3/1985 | Angle et al. | 165/48.1 |
| 4,771,611 A | * | 9/1988 | McNab | 62/311 |
| 4,827,733 A | * | 5/1989 | Dinh | 62/305 |
| 4,857,090 A | * | 8/1989 | Hartness | 62/91 |
| 4,926,656 A | * | 5/1990 | Hickley et al. | 62/310 |
| 4,941,324 A | * | 7/1990 | Peterson et al. | 62/94 |
| 5,453,223 A | * | 9/1995 | Maisotsenko | 261/153 |
| 6,574,975 B2 | | 6/2003 | Bourne et al. | |
| 6,845,629 B1 | * | 1/2005 | Bourne et al. | 62/304 |

OTHER PUBLICATIONS

Worek, W. M. et al., "Simulation of an Integrated Hybrid Desiccant Vapor-Comression Cooling System", Energy (Oxford), vol. 11, No. 10 (Oct. 1986), pp. 1005-1021.*
Commercial Solutions "OASIS" http://www.deschamps.com/products/productRecord.php?product_ID=48 (Jul. 1, 2004) pp. 1-3.

* cited by examiner

*Primary Examiner*—William E. Tapolcai
(74) *Attorney, Agent, or Firm*—Oliff & Berridge, PLC

(57) ABSTRACT

A roof top cooling unit has an evaporative cooling section that includes at least one evaporative module that pre-cools ventilation air and water; a condenser; a water reservoir and pump that captures and re-circulates water within the evaporative modules; a fan that exhausts air from the building and the evaporative modules and systems that refill and drain the water reservoir. The cooling unit also has a refrigerant section that includes a compressor, an expansion device, evaporator and condenser heat exchangers, and connecting refrigerant piping. Supply air components include a blower, an air filter, a cooling and/or heating coil to condition air for supply to the building, and optional dampers that, in designs that supply less than 100% outdoor air to the building, control the mixture of return and ventilation air.

18 Claims, 3 Drawing Sheets

HYDRONIC ROOFTOP COOLING SYSTEMS

This application claims the benefits of U.S. Provisional Patent Application No. 60/502,251 filed Sep. 12, 2003, the entire disclosure of which is herein incorporated by reference.

This invention was made with Government support under Contract #DE-FC26-00NT40991 awarded by the United States Department of Energy. The Government has certain fights in the invention.

BACKGROUND OF THE INVENTION

1. Field of Invention

This invention relates to improvements in packaged rooftop cooling units, and particularly to units that incorporate evaporative cooling to improve the efficiency, and reduce electrical demand of packaged rooftop cooling systems.

2. Description of Related Art

Most new low-rise non-residential buildings in the U.S. are cooled with packaged rooftop units ("RTU's") that include one or more compressors, a condenser section that includes one or more air-cooled condensing coils and condenser fans, an evaporator coil, a supply blower, an intake location for outdoor ventilation air, optional exhaust air components, and controls. Most RTU's also include dampers that facilitate an "economizer" cycle to cool using only outdoor air when air temperature is favorable. These RTU components are packaged by manufacturers in similar configurations that, because they are air-cooled, are inefficient and result in a high electrical demand. This inefficiency is particularly significant in dry climate locations where rapid growth and focus on low construction costs have caused a high percentage of non-residential cooling systems to use traditional RTU's rather than more efficient "central systems" using chillers and evaporative cooling towers.

In climates where summer afternoon temperatures routinely reach 95° F. and higher, but with dry air such that wet bulb temperatures rarely exceed 70° F., traditional RTU cooling efficiencies can be increased by 20% to 25% using an evaporative condenser air pre-cooler (ECAP). A related patent (U.S. Pat. No. 6,574,975 B2) awarded to the applicant entitled "Dual Evaporative Pre-Cooling System and Method Therefor" describes improved ECAP systems that can be retrofitted to conventional RTU's to improve their efficiency by pre-cooling both condenser and ventilation air.

One reason that evaporatively-cooled RTU's are not widely available is the "high cost of maintenance" reputation of evaporative cooling systems. This reputation is due chiefly to problems associated with hardness minerals in water and biological growth. Both of these conditions can lead to deposits on surfaces and in heat exchangers that can significantly interfere with water distribution and operating performance. Hardness minerals are typically present when ground water is used for the water supply. Biological growth typically occurs in locations that remain continuously wet, as is true of many evaporative cooler reservoirs.

At least 10% of supply air delivered by traditional RTU's is typically outdoor air needed for building ventilation. In some cases, particularly for laboratory facilities, traditional RTU's deliver 100% outdoor air. In warm weather, cooling of ventilation air represents a significant fraction of the total cooling load. In very dry climates, ventilation air can be pre-cooled by the same direct evaporative process used in ECAP's, but in most applications an indirect process that adds no moisture to the ventilation air is preferred.

On the condenser side, traditional RTU's use high airflow rates to compensate for their air-cooled design. On the evaporator side, such RTU's typically send indoor air through a contorted path across both cooling and heating heat exchangers as the air is drawn through return ducts into the RTU, around several tight turns inside the unit, and back through supply ductwork. The added pressure drop associated with this complex path results in high fan energy consumption that penalizes the system all year, particularly in the constant-speed systems most common in traditional RTU's. To compensate for this load, a constant blower speed is set high enough for peak cooling load conditions which wastes blower energy at all other times.

In the prior art, several large RTU's have been marketed that take advantage of evaporative cooling to either pre-cool ventilation air or reduce condensing temperatures. For example, a product from Mammoth Industries condenses a hot gas refrigerant by circulating it through a piping array under a water spray, with air drawn upward through the array by fans to increase the evaporation rate and thereby reduce condensing temperatures. Another example is the "Oasis" unit produced by Des Champs Laboratories. The Oasis uses an evaporatively-cooled heat pipe system to pre-cool ventilation air.

SUMMARY OF THE INVENTION

The present application is directed to packaged rooftop units, that provide heating, ventilation, and air conditioning (HVAC) to buildings.

This application presents new RTU designs that include evaporative cooling of both ventilation air and a condensing refrigerant, as well as other features, to significantly improve RTU efficiency.

In an exemplary embodiment of the invention, RTU efficiency is enhanced, particularly in dry climates, by better control of latent cooling that occurs when cooling coil surface temperatures are below the dew point temperature of air crossing an evaporator coil. In humid climates, substantial latent cooling is desirable, and often necessary to reduce the humidity of indoor air. However, in many dry climates, unnecessary latent cooling occurs that reduces cooling efficiency by as much as 20%. Better design and variable speed airflow and multiple evaporator coils with valved refrigerant controls to vary coil surface temperatures can increase cooling efficiency, and cold water condensed at the evaporator can be drained or pumped into the evaporative cooling reservoir to improve evaporative cooling effectiveness.

In various exemplary embodiments of the invention, improved RTU's that incorporate dual evaporative cooling systems that can recover heat from exhaust air, reduce latent cooling, and facilitate reduced blower speeds, are provided. In addition, improved RTU's that can deliver non-compressor cooling at appropriate times in dry climates when wet bulb temperatures are low, are also provided. These novel RTU's are particularly valuable if such non-compressor cooling process cools water that can be circulated through a thermal mass, such as concrete slabs, to pre-cool the building structure.

An exemplary embodiment of an RTU according to the present invention comprises: an evaporative cooling section that includes: at least one evaporative module that pre-cools ventilation air and water; a refrigerant-to-water condenser; a water reservoir and pump that captures and re-circulates water within the evaporative modules; a fan that exhausts air from the building and/or the evaporative modules; systems that refill and drain the water reservoir; a refrigerant section that includes a compressor, an expansion device, evaporator and condenser heat exchangers, refrigerant valves and connecting refrigerant piping; supply air components including a blower, an air filter, a cooling and/or heating coil to condition air for supply to the building, and optional dampers that, in designs that supply less than 100% outdoor air to the building, control the mixture of return and ventilation air; a hardware center that includes an optional hot water source, one or more circulating pumps and valves, pressure and electrical controls; and a cabinet that houses the unit.

Each evaporative section may consist of a structural enclosure, one or more evaporative heat exchangers contained within the enclosure, a water distribution system, openings that allow outdoor air to enter the evaporative heat exchanger(s), inlet screens that prevents bugs and debris from entering the system, a water fill/refill system, a circulation pump, and a reservoir that contains enough water to ensure continuous pump operation without running dry.

In an exemplary embodiment, the water refill system includes a pressurized water supply line, a fill valve, a float depth sensor, and controller to operate the refill system. This embodiment is used in conjunction with controls that limit biological growth, such as by regularly discharging the reservoir. A control/monitoring system includes a microprocessor controller with time clock and temperature sensors in the outdoor air, the evaporatively pre-cooled air, the building return air (if any), and the reservoir water. Based on these four temperature inputs, pre-programmed building operating schedule data, and cooling demand on the RTU, the controller may determine how to operate the system to maximize energy savings. The controller may also use these data in conjunction with power monitoring inputs to compute and report energy savings, and to diagnose potential operating problems.

BRIEF DESCRIPTION OF THE DRAWINGS

The invention will be described in detail in reference to the following drawings in which like reference numerals refer to like elements and where.

DETAILED DESCRIPTION OF PREFERRED EMBODIMENTS

Exemplary embodiments of the present invention are described hereafter with reference to the Figures. The exemplary embodiments may include the following:

1. evaporative cooling sub-systems including an indirect evaporative heat exchanger, a water reservoir, a pump, a water distribution system, an exhaust fan, a water supply system, and a reservoir drainage system;
2. refrigeration sub-systems including a compressor, a condenser, an evaporator, and an expansion device, to cool supply air for a building; and
3. air supply sub-systems including outdoor air inlets, a supply blower, and an air filter.

Figure 1:
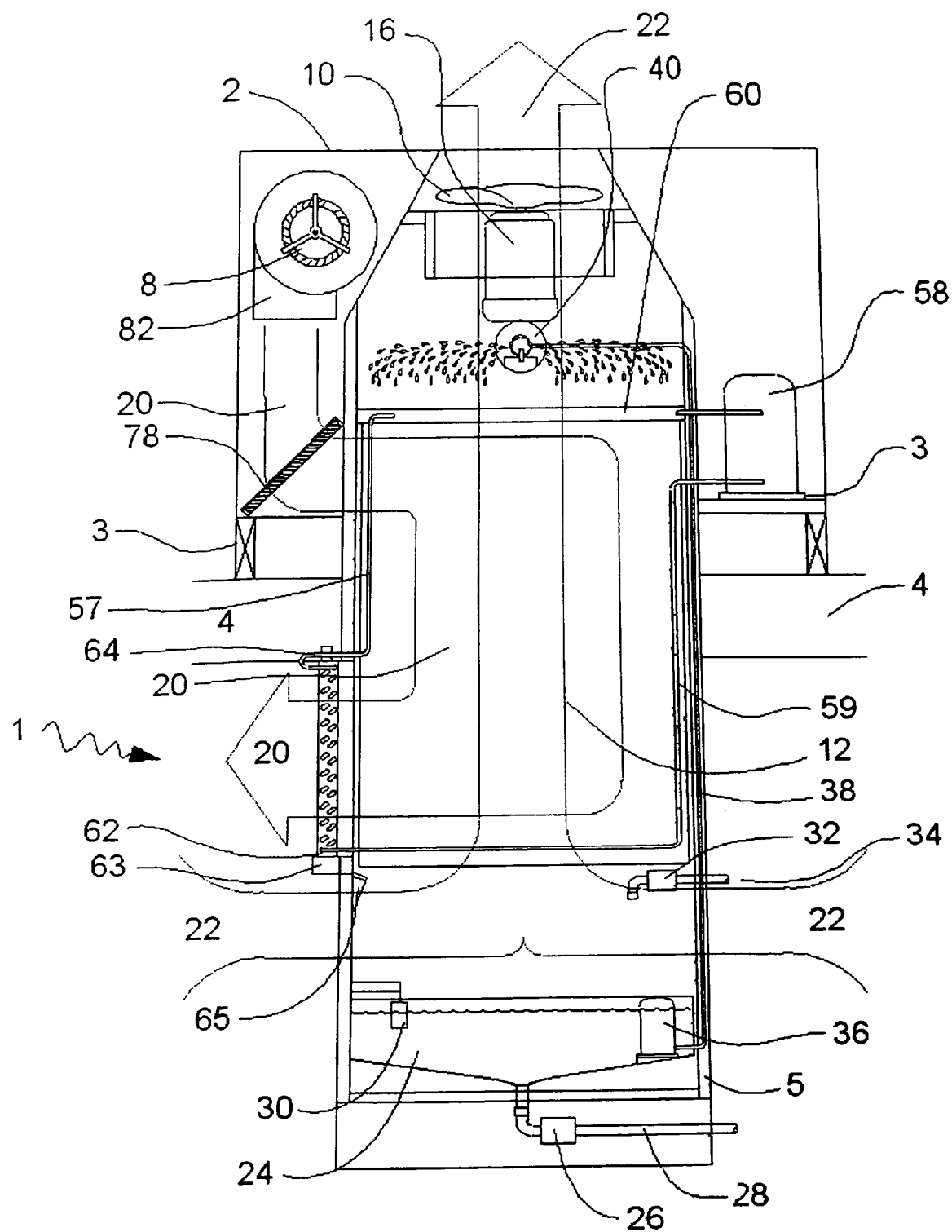
FIG. 1 is a cross-sectional view showing an exemplary embodiment of the present invention that supplies a building with conditioned 100% outdoor air, and can be placed partially above and partially below the roof surface.
Figure 2:
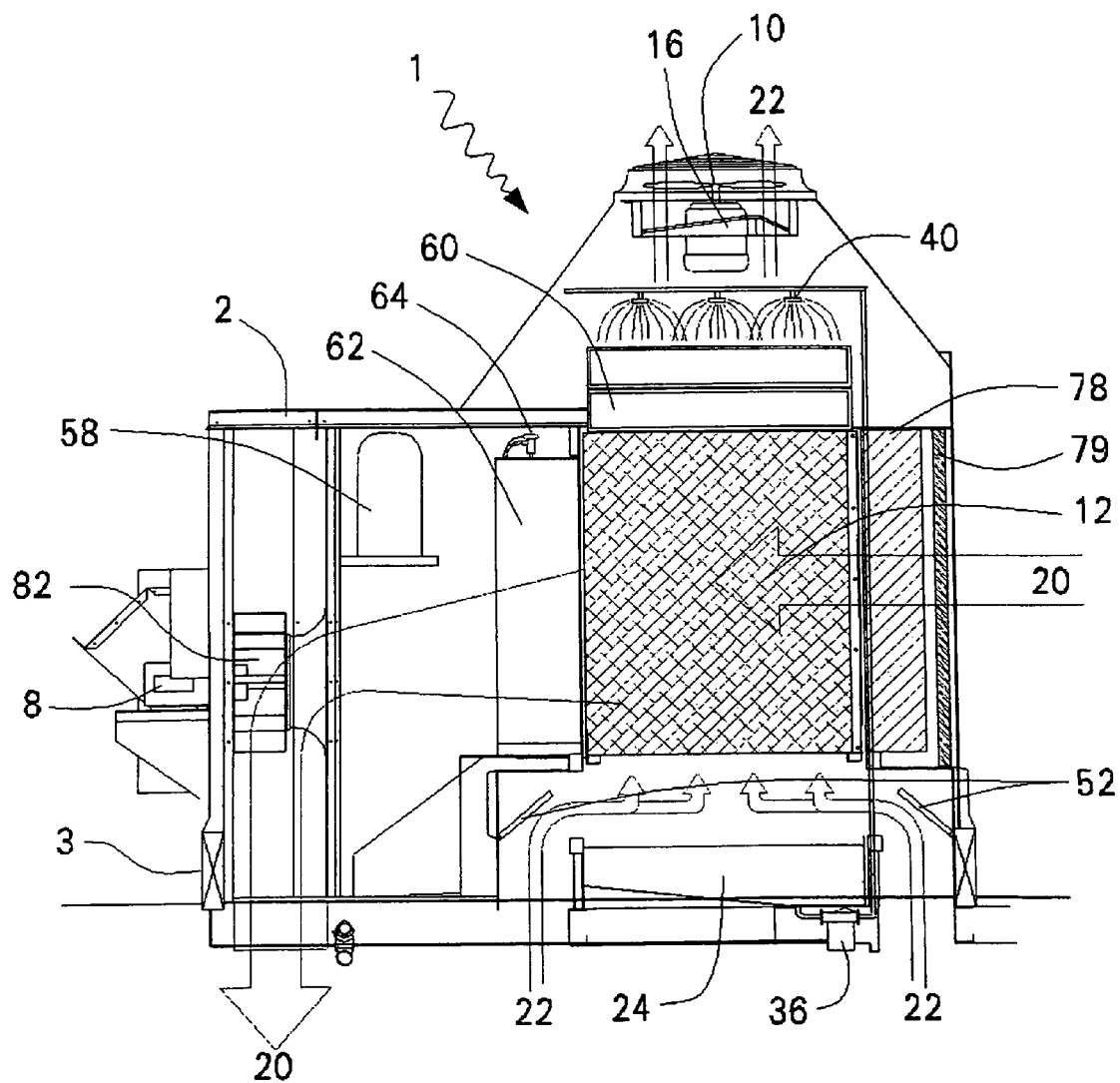
FIG. 2 is a cross-sectional view showing an exemplary embodiment of the present invention that supplies a building with conditioned 100% outdoor air and is placed entirely above the roof surface.

FIGS. 1 and 2 show exemplary embodiments that supply 100% conditioned outdoor air to a building, and are "cooling only" units, i.e., without space heating components. In the 100% outdoor air system, an amount of air equal to the supply air quantity must leave the building (ideally through the rooftop unit), and no building air returns to mix with the supply air 100% outdoor air is typically required in laboratory and hospital applications with contaminated air, and in high occupancy assembly buildings where ventilation air requirements are very large. For large open-plan buildings with multiple rooftop units, there is a trend toward using a few 100% outdoor air units for ventilation, with other units supplying entirely return air. This strategy largely eliminates air leakage through the outdoor air dampers on all but the 100% outdoor air units, when the building is being conditioned but not occupied.

As shown in FIG. 1, the 100% outdoor air RTU 1 comprises a weatherable upper cabinet 2 located above the roof structure 4 that encloses most of the components that might require service. Service from the roof is generally preferable in commercial buildings because it can be carried out with minimal disturbance of indoor activities. Placing some of the components below the roof minimizes the visible height of the unit, and also minimizes the surface area of exterior exposure, thus reducing winter heat losses and summer heat gains through the cabinet. In the exemplary embodiment, components in the upper cabinet 2 include a supply blower 82, such as a squirrel cage type blower, powered by a drive motor 8, an air filter 78, an exhaust fan 10 powered by a drive motor 16, a compressor 58 and a refrigerant condenser 60, and at least one water spray distributor 40. The upper cabinet 2 rests on and seals to a curb 3 that extends around the perimeter of the upper cabinet 2.

Passing through the roof 4 is a lower cabinet 5 that contains an indirect heat exchanger 12 and refrigerant lines 57 and 59 that connect to a refrigerant evaporator 62 at a lower side of the indirect heat exchanger 12. The lower cabinet 5 need not withstand outdoor conditions and is linked to the upper cabinet 2. Below the indirect exchanger 12 is a water reservoir 24, a circulation pump 36, a drain valve 26 connected to the reservoir 24 and a drain pipe 28, a float sensor 30, and a fill valve 32 connected to a water supply pipe 34.

When the RTU 1 operates in a cooling mode, the evaporative cooling subsystem cools water and air by using the pump 36 to deliver water from the reservoir 24 through the pipe 38 to the water distribution nozzles 40 disposed above the condenser 60, which in turn is located above the indirect evaporative heat exchanger 12. The indirect exchanger 12 comprises parallel plates or flattened tubes (not shown) that separate the wet and dry passages (not shown). After passing over the condenser 60, water drains downward through the wet passages and out of the bottom of the exchanger 12 into the reservoir 24. As the water flows down through the wet passages of the indirect evaporative heat exchanger 12, the water is evaporatively-cooled by a relatively dry building air stream 22 flowing upward through the wet air passages. The exhaust fan 10, driven by the motor 16, causes the air stream 22 to flow into an airspace above the reservoir 24, upward through the wet passages of the heat exchanger 12, through the condenser 60 and the spray nozzles 40, and out through the top of the upper cabinet 2.

To start the evaporative cooling cycle, water is added though the reservoir fill valve 32, which also operates in response to a signal from the float switch 30 to "top off" the reservoir 24 as water evaporates. After a delay period following the cooling cycle, the reservoir drain valve 26 is opened to drain the reservoir through the drain line 28. The reservoir 24 is preferably drained at least daily to allow all wet components to dry, thereby minimizing the likelihood of biological growth.

The supply air subsystem may operate concurrently with the evaporative cooling subsystem. As the building air stream 22 moves upward through the wet passages, the supply blower 82 forces outdoor air across the filter 78 and into the dry passages of the heat exchanger 12. This supply air stream 20 enters through top side openings of the heat exchanger 12 into the dry passages, spreads across the width of the dry passages, flows downward, and emerges through lower side openings of the exchanger 12 into the evaporator coil 62. After passing through the evaporator coil 62, the supply air stream 20 may be routed either directly into a building, or into ductwork for distribution through registers or diffusers (not shown). The supply air stream 20 is indirectly evaporatively cooled by contact with wall surfaces of the heat exchanger 12, which are cooler than the air stream 20 whenever the wet bulb temperature of the "wet" building air stream 22 is lower than the dry bulb temperature of the dry supply air stream 20, as is almost always the case in summer.

The supply air stream 20 can be further cooled by operating the refrigeration subsystem, driven by the compressor 58 which delivers a high pressure refrigerant gas to the condenser 60, giving up heat to water distributed by the nozzles 40. As the high pressure gas gives up heat, the refrigerant condenses, and the now liquid refrigerant moves through a liquid line 57 to an expansion device 64 at the evaporator 62. After passing through the expansion device 64, the refrigerant expands from a liquid to a gas in the evaporator 62, absorbing heat. The source of this heat is the air stream 20, which is cooled in the process. The low pressure refrigerant gas flows through the gas line 59 back to the compressor 58, where it continues its cyclical journey.

When the evaporative cooling subsystem is operating and the refrigeration subsystem is not, the supply air 20 is cooled "sensibly" without the addition or removal of moisture. No moisture is added to the supply air 20 because the evaporative cooling is indirect. The exhaust air stream 22 is humidified as it is evaporatively cooled, but it only cools the supply air stream 20 through its cooling effect on the walls of the heat exchanger 12. When the refrigeration subsystem is operating, the subsystem can dehumidify the supply air 20 if the surfaces of the evaporator coil 62 are colder than the dew point temperature of the supply air stream 20 crossing the coil 62. Cold condensate from the evaporator 62 can be collected in a condensate pan 63 that drains directly through a spout 65 into the reservoir 24. Since the condensate is cooler than the water in the reservoir 24, the condensate aids the evaporative cooling process.

In the heating season, the air flow components of the RTU 1 may be operated with the evaporative cooling subsystem off to deliver ventilation air to the building. In this mode, the supply air stream 20 is indirectly tempered as it flows through the dry passages of the indirect heat exchanger 12. In winter, this mode provides heat recovery from building exhaust air, which is generally warmer than outside air.

In an exemplary embodiment, a matched variable speed blower 82 and exhaust fan 10 set may be used to vary the air flow rate in response to the actual ventilation and cooling requirements to significantly reduce blower energy consumption, by comparison with conventional "constant speed" rooftop cooling and ventilation units. Use of the evaporative pre-cooling feature and the variable speed supply blower and exhaust fan set can combine to minimize unnecessary latent cooling by sensibly pre-cooling the ventilation air, and by allowing a blower speed selection that accomplishes only the desired amount of latent cooling.

This exemplary embodiment supplies conditioned air to a building while consuming much less energy than conventional rooftop units, based on the following strategies:
1. Using an evaporative water-cooled condenser;
2. Evaporatively pre-cooling supply air in the indirect heat exchanger;
3. Avoiding compressor operation when possible;
4. Minimizing the penalty of unnecessary latent cooling; and
5. Recovering heat from exhaust air in winter.

While the exemplary embodiment shown in FIG. 1 could be placed entirely above the roof, with supply air ducted downward into the building, the unit would be very tall and would thus be visible from the ground under some circumstances. FIG. 2 shows a cross-sectional view of an exemplary embodiment of the present invention that supplies a building with conditioned 100% outdoor air and is placed entirely above the roof surface in a horizontal configuration that facilitates a relatively low profile. This exemplary embodiment comprises a weatherproof cabinet 2 that houses all components of the RTU 1, including a cross flow indirect heat exchanger 12, with outdoor air entering through a screen 79 and a filter 78.

The horizontal air stream 20 proceeds from the filter 78 into the dry passages of the indirect exchanger 12, where the air stream 20 is cooled by conductive/convective contact with the wet passages that are evaporatively cooled. A building exhaust air stream 22 is pulled vertically through the wet passages by an exhaust fan 10 driven by a fan motor 16. The wet surfaces of the exchanger 12 are preferably treated or coated to wick water thoroughly, thus maximizing evaporation at the surface and heat transfer through the plate walls (not shown). The indirect heat exchanger 12 may comprise either parallel plates or vertically-oriented tubes, preferably flattened to increase the surface area of the exchanger 12 and reduce pressure drop imposed on the dry air stream 20. Disposed above the exchanger 12 is a condenser 60 and at least one water spray distributor 40. Such a water spray system cools the condenser 60, and water draining from the condenser 60 wets vertical airflow passages of the exchanger 12.

The horizontal dry air stream 20 passes through an evaporator 62 after leaving the dry passages of the indirect exchanger 12. As the cooling coil in the refrigerant system (whose connecting piping is not shown), the evaporator 62 receives a low pressure liquid refrigerant from the thermal expansion valve 64. The refrigerant quickly expands to a vapor state and cools in the evaporator 62, thus extracting heat from the air stream 20. The low pressure gas leaving the evaporator 62 is then drawn into the compressor 58, where the gas is compressed to become a hot, high pressure gas for delivery to the condenser 60. At the condenser 60, the system discharges heat to the exhaust air stream 22. The condenser 60 is preferably constructed of copper, or other suitable material, to prevent corrosion, and will typically be configured as a multiple-row coil with or without fins.

When the condenser 60 includes fins (not shown), the refrigerant system may be equipped with a reversing valve (not shown) that permits the refrigerant system to function as a heat pump in the heating season. By being operated without water in the indirect exchanger 12, this mode can provide efficient heating because the air stream 22 entering the evaporator coil 62 (the condenser in cooling mode) is warmer than outdoor air. In the unlikely event of freezing of the evaporator coil 62, it is not necessary to reverse the cycle, rather, simply turning off the compressor will defrost the coil.

In FIG. 2, the pump 36 is external to the reservoir 24. The blower 82 pulls air through the indirect exchanger 12. Also, a "plug fan" is shown that pressurizes a supply plenum. The plug fan of FIG. 2 is driven by an external motor 8. This strategy improves cooling performance by preventing motor heat from entering the cooled air stream 20. As previously, building exhaust air enters the wet passages at air stream 22. To minimize the space required between water in the reservoir 24 and the underside of indirect exchanger 12, building exhaust air should enter from both sides of the reservoir 24. FIG. 2 shows exhaust air dampers 52 to prevent upward convection of warm building air when the cooling system is not operating. Alternatively, a single damper may be placed before or after exhaust fan 10.

Figure 3:
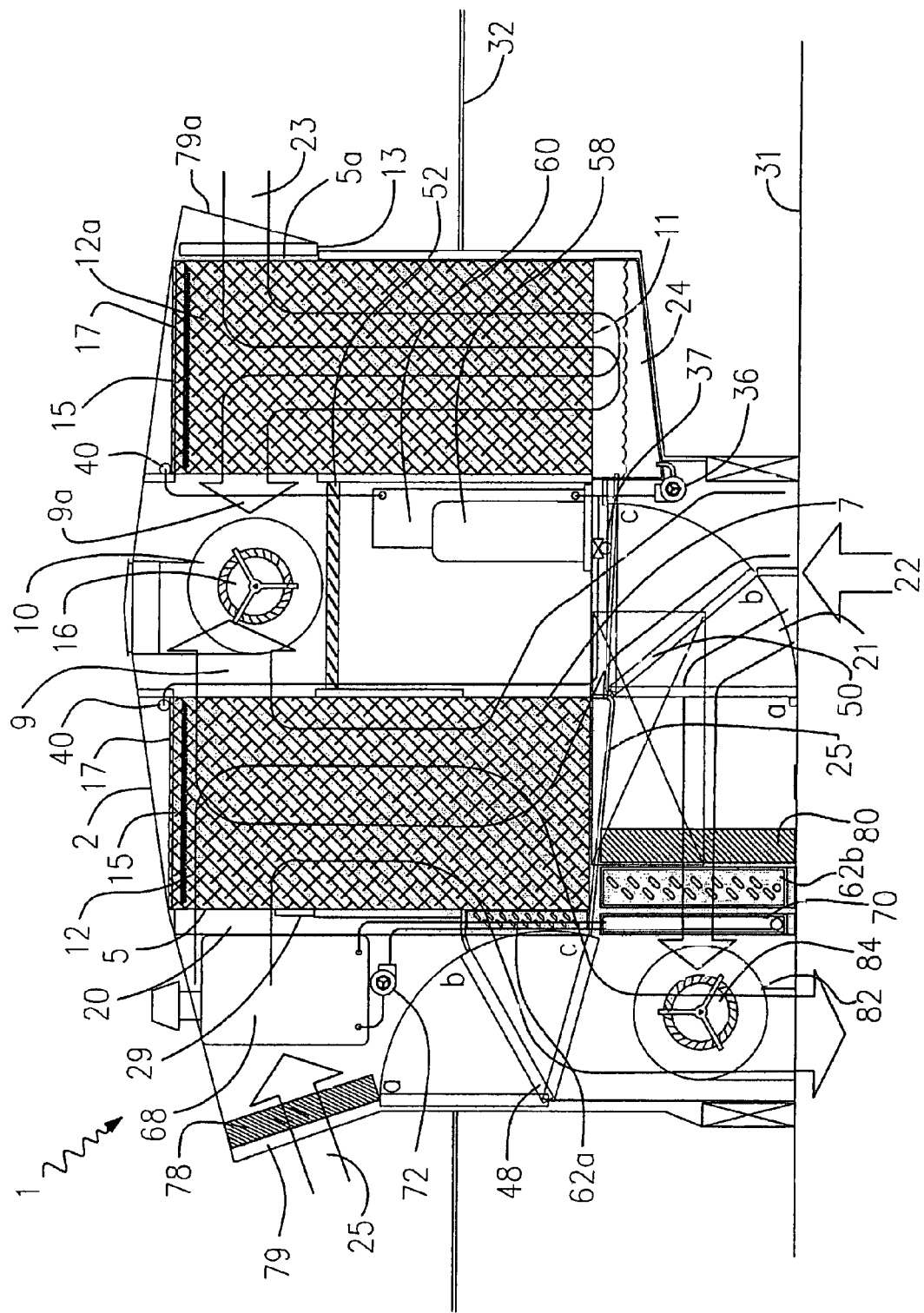
FIG. 3 is a cross-sectional view showing an exemplary embodiment of the present invention that can supply a mixture of conditioned outdoor and return air, and that can be placed either partially above and partially below the roof surface, or entirely above the roof surface.

FIG. 3 shows a cross-sectional view of an exemplary embodiment of the present invention that can supply a building with 100% outdoor air, a mixture of outdoor air and conditioned return air, or 100% conditioned return air. This embodiment may be placed either entirely above the roof surface or partially above and partially below the roof surface. Several design features to be discussed with respect to FIG. 3 facilitate a low profile even when the entire assembly is placed above the roof. In this exemplary embodiment, a weatherproof cabinet 2 that houses the components of the RTU 1 including an indirect heat exchanger 12 and a condenser cooling heat exchanger 12a, with the outdoor air streams 23, 25 entering in two locations. For example, the inlet air stream 25 can enter through a screen 79 and a filter 78 toward the heat exchanger 12, and inlet air stream 23 can enter through a screen 79a into the heat exchanger 12a.

Each of the heat exchangers 12, 12a has a unique function, but the exchangers 12 and 12a share a common water distribution system and a common wet passage air moving system. The exchanger 12 evaporatively pre-cools ventilation air, while the exchanger 12a cools the refrigerant condenser 60. The evaporative condenser cooler element, such as a parallel plate "sub-wet-bulb" element shown as the condenser cooler element 12a, provides the increased ability of the parallel plate configuration to cool water to a lower temperature to aid in condenser cooling.

Several features shown in FIG. 3 are designed to reduce the height of the RTU 1. First, the condenser 60, located near the compressor 58, is no longer in the exhaust air path, as shown in FIGS. 1 and 2. Second, wet exhaust air outlets 9 are placed along facing top sides of the heat exchangers 12 and 12a, rather than along the top edges. This strategy allows a shared exhaust blower 10 and its motor 16, such as a direct-drive motor, to be placed below the top edges of the heat exchangers 12, 12a. Third, the water distribution systems for the wet passages no longer include spray heads, thereby minimizing the vertical space required above the evaporative heat exchangers 12, 12a.

In this exemplary embodiment, water is delivered to the exchangers 12, 12a through perforated or porous pipes 40 into feed "semi-troughs" 15 integral with the thermoformed heat exchange plates (not shown), at the tops of the heat exchangers 12 and 12a. The perforated pipes 40 are oriented transverse to the semi-troughs 15, which are formed by the top edges of adjacent plates in heat exchangers 12 and 12a. The plates make sufficiently close contact along the bottoms of semi-troughs 15 that a coating material on the wet surfaces of the prevents the downward flow of water droplets. Water builds up in the widened troughs, while a narrow slot at the bottom of each trough allows water to wick steadily downward. The semi-troughs 15 are sufficiently deep that at a desired water flow rate, a balance develops in which the downward water flow rate just equals the water supply rate into the semi-troughs 15. This balance prevents water from overflowing at the ends of the troughs.

Pipes 40 are porous or perforated with closely spaced so that each semi-trough 15 receives adequate water flow to fully wet its associated surfaces below. The wet surfaces of the exchanger 12 are preferably treated or coated to wick water thoroughly, thus maximizing evaporation at the surface-and heat transfer through the plate walls. A "flocking" material may be used to promote wicking to aid in the effective performance of the water feed troughs 15 along the top plate edges.

Water used in the exchangers 12, 12a is gathered in the reservoir 24. In an exemplary embodiment, the reservoir 24 is disposed beneath at least one of the exchangers 12, 12a but above the roof. In such an embodiment, the reservoir may be cantilevered above the roof, extending outwardly from a point where the RTU 1 penetrates the roof.

Both of the heat exchangers 12 and 12a, may be referred to as "sub-wet bulb" or "dew point" coolers because if infinitely tall they are theoretically capable of reducing air and water temperatures at the lower extremity of the heat exchangers 12, 12a to the dew point temperature of the entering air streams 25, 23. However, economic constraints, including the costs of the heat exchanger materials and of blower power required to create the necessary air flow rates, prevent a close approach to the dew point. Nevertheless, sub-wet bulb temperatures may be practically achieved in these counter flow evaporative coolers.

A dry ventilation air stream 20 enters the top edge 5 of heat exchanger 12, then turns to flow downward, turning again at the bottom to exit low on the same side it entered. The building exhaust air stream 22, drawn by the exhaust blower 10, follows a similar path in reverse on the opposed side of the exchanger 12, entering low through the openings 7 in the wet passages of the heat exchanger 12 and leaving high through the wet air exhaust outlets 9. The top edges of the heat exchangers 12 and 12a are closed to air flow by the water feed troughs 15. The top edges of the water feed troughs 15 are closed by inverted channels 17 that prevent water from entering the dry channels (not shown) of the exchangers 12, 12a and also prevent air from leaking from or into either the wet or dry passages along the top edges of the heat exchangers 12 and 12a. The bottom edges of heat exchanger 12 are closed in a way that drains wet passage water toward the wet passage inlets of the lower openings 7, where water is collected in a trough 25 and drained into the reservoir 24 beneath the heat exchanger 12a.

The inlet air stream 23 for the exchanger 12a enters through the screen 79a at the top side openings 5a, turns to flow downward through the dry passages, exits through bottom edge openings 11 above the reservoir 24, enters corresponding bottom openings 11 of the wet passages and flows upward through the wet passages where the air is evaporatively cooled. The air, then turns and exits through top side openings 9a. The movement of the air stream 23 is entirely caused by suction from the exhaust blower 10. Water flowing downward through heat exchanger 12a drains directly out from the bottom openings 11 into the reservoir 24. Cooled water from the reservoir 24 is circulated through the condenser 60 effecting the vapor compression cycle performance thereby increasing the operating efficiency of the compressor 58.

The refrigerant loop shown in FIG. 3 uses a closed condenser 60, rather than an open coil under a spray nozzle system, as shown in FIGS. 1 and 2. The closed counter flow condenser 60 comprises a cylindrical, vertical-axis polymeric container with internal heat exchanger (not shown) in which a refrigerant gas condenses to a liquid state. The refrigerant preferably enters at the top of the container, flowing downward in parallel through multiple heat exchange tubes (not shown) with extended surface area. Cool water from the reservoir 24 delivered by the pump 36 enters the condenser 60 at the bottom, flowing upward in close contact with the heat exchange tubes. The water is warmed as it proceeds upward, cooling the refrigerant.

In operation, as shown in FIG. 3, outside inlet air stream 25 is drawn into the conditioned space of a building by a supply blower 82. The outside air 25 may be passed through the exchanger 12 to be pre-cooled. Water used to moisten parallel plates in the exchanger 12 passes into the reservoir 24 and is recirculated. For example, water from the reservoir 24 is used to cool the condenser 60 of the refrigerant subsystem or loop described above. To cool the condenser the water is passed through the exchanger 12a where the water is cooled and returned to the reservoir 24 for use in cooling the condenser 60 as described above.

A first advantage of such a closed condenser is that it does not need to be located above the heat exchangers, thereby reducing the overall height of the RTU 1. A second advantage of a closed condenser is improved efficiency. The "stratified" counter flow design results in lower condensing temperatures compared to an open spray system in which warm moist air and water droplets contact the underside of the condenser. Also, the closed condenser's forced, full surface contact between water and the multiple refrigerant tubes provides better heat transfer than is provided by an open condenser.

Other refrigerant components of this embodiment are similar to those previously described with reference to FIGS. 1 and 2, except that dual, valved evaporator coils are provided for improved latent cooling control. From the compressor 58 a hot, high pressure refrigerant gas flows to the condenser 60, where it condenses and gives up heat to the water stream. Liquid refrigerant from the condenser 60 passes through an expansion device (not shown) and then enters the evaporator coils 62a and 62b, plumbed in parallel and each with a solenoid inlet valve. Since the air streams passing over the coils 62a and 62b have different psychrometric conditions, the dual valved evaporator coils in conjunction with variable airflow rates allow precise control of the upper humidity limit. In normal operation, refrigerant would flow through both coils, and the evaporating temperature would be relatively high, maximizing efficiency and minimizing moisture condensation on the coil surfaces. When the indoor relative humidity approaches its allowable limit, refrigerant flow to the coil in the dryer air stream would be in interrupted, causing all refrigerant to flow through the other coil. This strategy will substantially drop the surface temperature in the more humid air stream and thereby increase the latent cooling rate. After evaporating and thereby removing heat from the coil 62, the lukewarm low pressure gas leaves the evaporator coil 62 and flows to the compressor 58 to continue the refrigerant circuit. Air passing through the evaporator coil 62 is further cooled before entering the building.

The RTU 1 shown in FIG. 3 further includes heating components such as a heater 68. In an exemplary embodiment, a hydronic heating system includes a heater 68, such as a tankless gas-fired water heater from which a heating circulating pump 72 delivers heated water, an anti-freeze solution, or other appropriate fluid, to a heating coil 70 in the return air stream 20 near evaporator coil 62. The heating fluid returns to the heater 68 after passing through the heating coil 70. An expansion tank (not shown) will typically be in the loop as well to accommodate for the temperature induced volume changes in the heating fluid. Upstream of the two coils 62, 70 is an air filter 80 that removes particles and contaminants from the return air 21. Alternatively, the heating subsystem may comprise a gas furnace section downstream of the evaporator coil in the supply air stream.

With regard to placement on the roof, the RTU 1 shown in FIG. 3 may be located either fully above the roof, as shown with roof deck corresponding to line 31, or partially below a roof deck, coincident with line 32. This flexibility of installation is possible because the outdoor air stream inlets 23, 25 and exhaust air from the blower 10 are located near the top of the RTU 1. When the RUT is set partially below the roof, lower components including the compressor 58, the condenser heat exchanger 60, the supply blower 82, and the evaporative pump 36 may be serviced from above by removing or repositioning one or more dampers 48, 52.

In the exemplary embodiment shown in FIG. 3, three dampers 48, 50 and 52 are used to control four air flow modes, which are:

Mode 1) "Full economizer" cooling with 100% outdoor air and compressor off;

Mode 2) 100% outdoor air with heat recovery, with or without evaporative cooling;

Mode 3) Mixed air operation with at least code-required minimum outdoor air; and Mode 4) 100% return air.

Mode 1 provides an ideal economizer operating cycle because relatively direct air paths are provided for both the inlet and exhaust air streams 25, 27. In this mode, an inlet damper 48 is in position "a" and the inlet air stream 25 bypasses both the heat exchanger 12 and the cooling and heating coils 62, 70 and is drawn directly into the supply blower 82 that is driven by the blower motor 84, to deliver the inlet air 25 to an occupied space. A return damper 50 is also in position "a", closing the coils 62b and 70 to return air and causing the exhaust air stream 27 to pass directly upward through the exhaust damper 52 into the exhaust blower 10. Economizer operation of Mode 1 can be enhanced by an evaporative pump 36 to evaporatively cool the heat exchangers 12 and 12a, since some air will pass through both the dry and wet passages of the exchanger 12. The dry air stream 20 of the exchanger 12 can be significantly cooled in this manner, as it benefits from the water cooling capability of both heat exchangers 12, 12a.

Mode 2 may be applied in all seasons when the building is occupied and the building thermostat is not demanding either cooling or heating. This mode also prevents air flow through the cooling and heating coils 62b, 70. In this mode, the inlet damper 48 is in position "b", the return damper 50 is in position "a", and the exhaust damper 52 is closed. In the heating season, when the evaporative pump 36 is not operated, this mode accomplishes heat recovery from the building exhaust air using the heat exchanger 12. A winter closure 13 is used to prevent outdoor air from entering the exchanger 12a, so that the exhaust blower 10 only draws air through the exchanger 12. In other seasons, this mode can act as a cooling stage by operating the evaporative pump 36 to cool the ventilation air in the heat exchanger 12.

Mode 3 may be used when the building is occupied and the thermostat demands either cooling that cannot be met by Modes 1 or 2, or heating. The inlet and return dampers 48 and 50 are both in position "b", and the exhaust damper 52 is closed. As with Mode 2, the pump 36 is only operated when there is a cooling demand. In this mode only the return air is conditioned by the cooling or heating coils 62b, 70. This strategy, whose benefits include, for example, reduced coil costs and reduced blower energy use, is facilitated by the substantial pre-cooling and heat recovery accomplished in the heat exchanger 12. In an exemplary embodiment, adjustable plates 29 may be placed at the dry and wet passages inlets (not shown) to the heat exchanger 12 to achieve the desired ventilation air quantity.

Mode 4 may be used in any condition when a cooling or heating load is sensed by the thermostat and either the building is unoccupied or a $CO_2$ sensor (not shown) determines that, even though the building is occupied, no ventilation air is required at the moment. In Mode 4, the inlet and return dampers 48 and 50 are both in position "c", and the exhaust damper 52 is closed. As with Modes 2 and 3, the pump 36 is only operated when there is a cooling demand. The ventilation exchanger 12 does not operate in this mode because both the dry and wet passage airflows are blocked. A motorized valve 37, or other appropriate means, stops water flow to the water passages of the heat exchanger 12, so all water from the pump 36 flows to the top of the heat exchanger 12a to provide efficient condenser cooling.

The exemplary embodiments described above are capable of cooling water in the reservoirs 24 to a temperature near, or even below, the wet bulb temperature of outdoor air. The outdoor wet bulb temperature during most nights and much of the day, in many dry climates, is cooler than the desired indoor dry bulb temperature. Thus, if a building is equipped with hydronic tubing in a floor slab or other massive element, it is advantageous to circulate cooled reservoir water through the element to discharge building heat in a manner that stores "cooling effect" in the element. For example, the RTU 1 shown in FIG. 3 may be operated during summer nights, at a time when no air is being delivered to the building, to cool a floor slab and thereby delay the time the next day when mechanically cooled air is required. Implementation of this feature, while not shown specifically with reference to each figure, is a simple matter of adding one or more valves to the water distribution system, and one or more algorithms to the control logic.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, other combinations and configurations, including more, less, or only a single element, are also within the spirit and scope of the invention. For example, an alternate version of the exemplary embodiment represented in FIG. 3 uses a direct evaporative cooling element in place of the parallel plate "sub-wet-bulb" element shown as condenser cooler element 12a.

What is claimed is:

1. A packaged cooling device for conditioning air within a conditioned space, comprising:
a housing enclosing the following elements:
a refrigerant loop including a compressor, a condenser, and a direct-expansion evaporator;
a first air mover that moves air through a conditioned space;
an evaporative condenser cooling section having an air inlet to receive outside air and a plurality of barriers that define dry passages and wet passages;
an indirect evaporative cooling section having a first air inlet to receive outside air, a second air inlet to receive building return air, and a plurality of barriers that define dry passages and wet passages;
at least one water distribution system that provides water to the wet passages of the indirect evaporative cooling section and to the wet passages of the evaporative condenser cooling section; and
a second air mover that moves air from the air inlet of the evaporative condensor cooling section through the evaporative condensor cooling section to the outdoors, and moves air from the second inlet of the indirect evaporative cooling section through the wet passages of the indirect evaporative cooling section to the outdoors,
wherein the elements are arranged such that:
the outside air entering the first air inlet of the indirect evaporative cooling section is indirectly evaporatively-cooled in the dry passages by conductive contact with the wet passages through the barriers to cool the outside air, and
the outside air entering the air inlet of the evaporative condenser cooling section cools water passing through the wet passages of the evaporative condenser cooling section for circulation through the condenser.

2. The device of claim 1, wherein the barriers are parallel vertical plates.

3. The device of claim 1, including a hydronic heater disposed in the housing, the hydronic heater comprising a water heating device, a hydronic heating coil, a circulating pump, and connecting piping for circulating heated water through a heating coil disposed in a return air stream to heat building air recirculated through the device.

4. The device of claim 1 wherein the housing penetrates a roof of the conditioned space, and the indirect evaporative section, the evaporative condenser cooling section, the second air mover, the compressor, and the condenser extends above the roof, and the direct-expansion evaporator and the first air mover extend below the roof.

5. The device of claim 4, wherein the first air mover is positioned for removal and service from the roof without requiring removal of the indirect evaporative section, the evaporative condenser cooling section, the second air mover, or the compressor.

6. The device of claim 1, further comprising an inlet damper moveable between a first damper position that allows a flow of outside air to the first air blower that bypasses the indirect evaporative cooling section, a second damper position that allows a flow of outside air to the first air blower and prevents outside air from bypassing the indirect evaporative cooling section, and a third damper position that prevents flow of outside air to the first air blower.

7. The device of claim 1, further comprising a return damper movable between a first damper position that allows a flow of building return air to the second air mover and prevents a flow of building return air to the first air mover, a second damper position that allows a flow of building return air to the first air mover and a flow of building return air to the second air mover, and a third damper position that allow a flow of building return air to the first air mover and prevents a flow of building return air to the second air mover.

8. The device of claim 1, further comprising an exhaust damper moveable between a first damper position that allows a flow of building return air to the second air mover, and a second damper position that prevents a flow of building return air to the second air mover.

9. The device of claim 1, wherein the evaporative condenser cooling section comprises a parallel plate evaporative cooler comprising a plurality of vertical plates that define indirect passages and alternating direct passages wherein the direct passages are evaporatively cooled, and the outside air enters the indirect passages, flows downward through the indirect passages, emerges from the indirect passages, is drawn into the direct passages, flows upward through the direct passages, and is drawn out of the direct passages and discharged to the outside by the second air mover.

10. The device of claim 9, wherein the condenser is a refrigerant-to-water condenser and the water distribution system recirculates water from a reservoir beneath the evaporative condenser cooling section to the refrigerant-to-water condenser, to the direct passages of the evaporative condenser cooling section and to the wet passages of the indirect evaporative section, and all recirculated water drains to the reservoir under the condenser cooling section.

11. The device of claim 10, wherein the water distribution system directs a first recirculated water stream from the reservoir through the refrigerant-to-water condenser to the direct passages, and a second recirculated water stream from the reservoir to the wet passages.

12. The device of claim 11, wherein the water distribution system includes a valve to block the first recirculated water stream at times when no air is flowing through either the dry passages or the wet passages.

13. The device of claim 12, further comprising a thermal storage medium and a controller that operates a valve to direct the second water stream from the reservoir through the thermal storage medium before entering the refrigerant-to-water condenser.

14. The device of claim 13, wherein the controller directs water through the thermal storage medium and operates the second air mover during prescribed time periods when the refrigerant loop is not operating, and the water is cooler than the thermal storage medium.

15. The device of claim 14, wherein the thermal storage medium is an element of a building.

16. The device of claim 15, wherein the thermal storage element is concrete.

17. The device of claim 1, wherein water that condenses on the direct-expansion evaporator flows into the water distribution system.

18. The device of claim 1, wherein water that condenses on the direct-expansion evaporator is directed into the water distribution system.

* * * * *